ated June 30, 1970

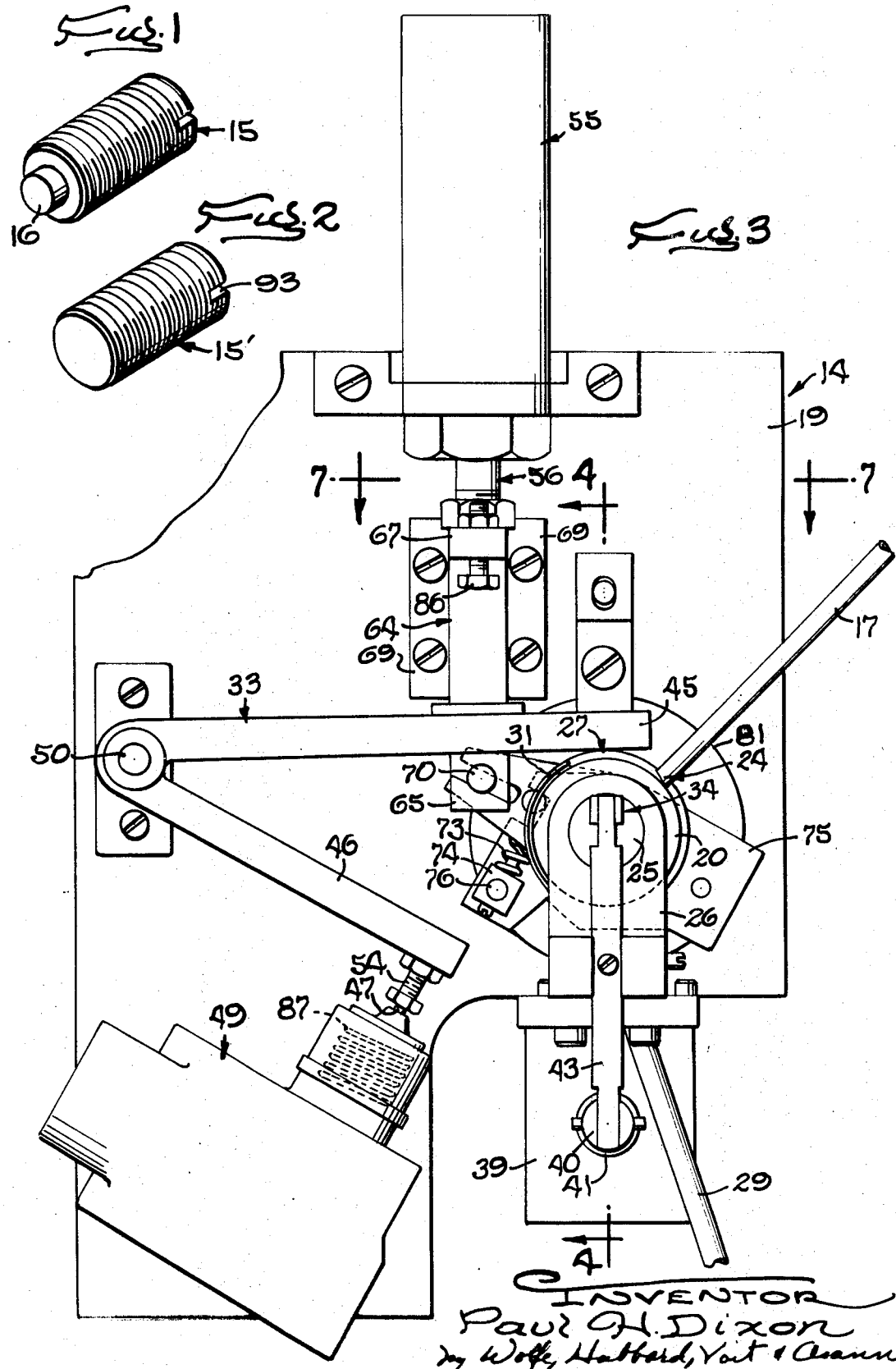

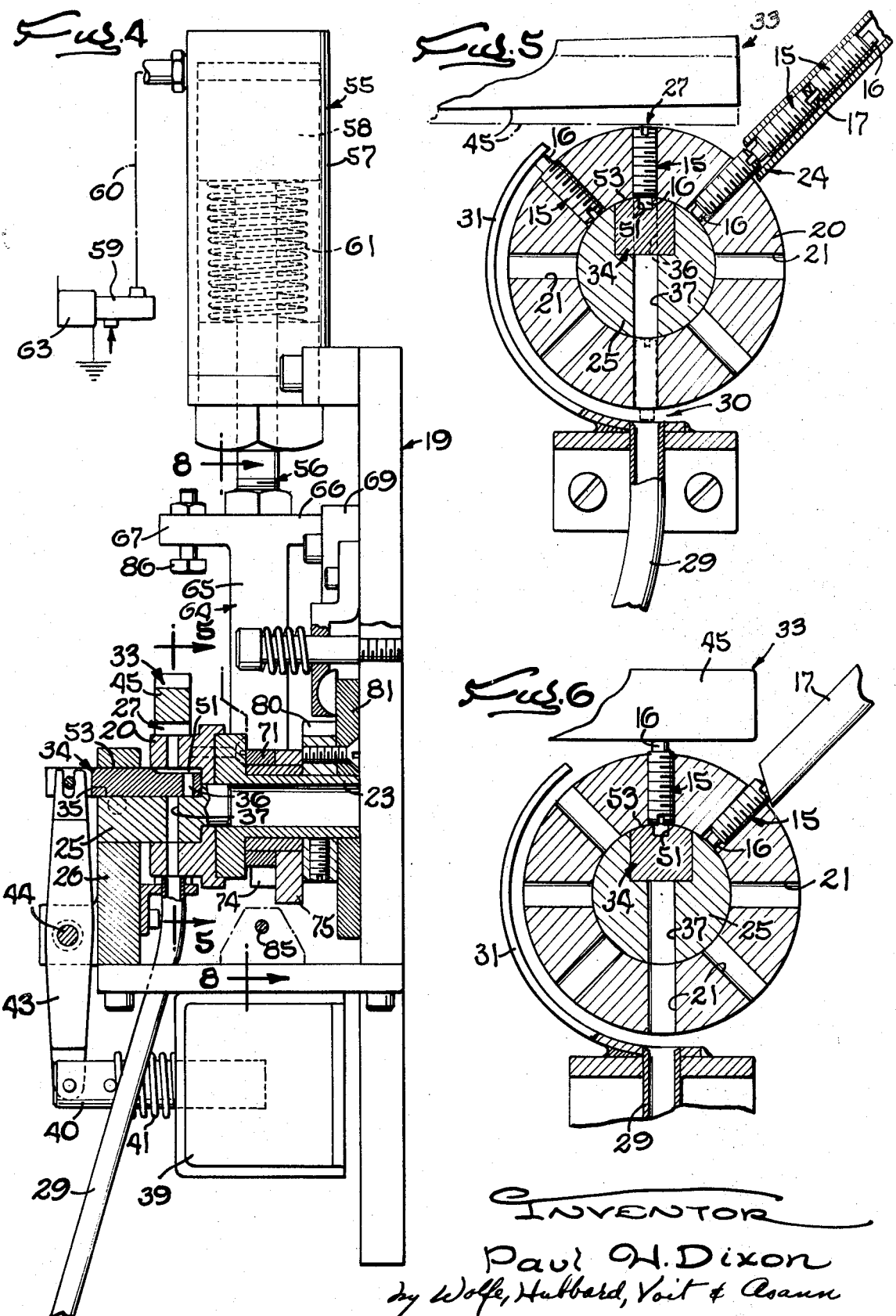

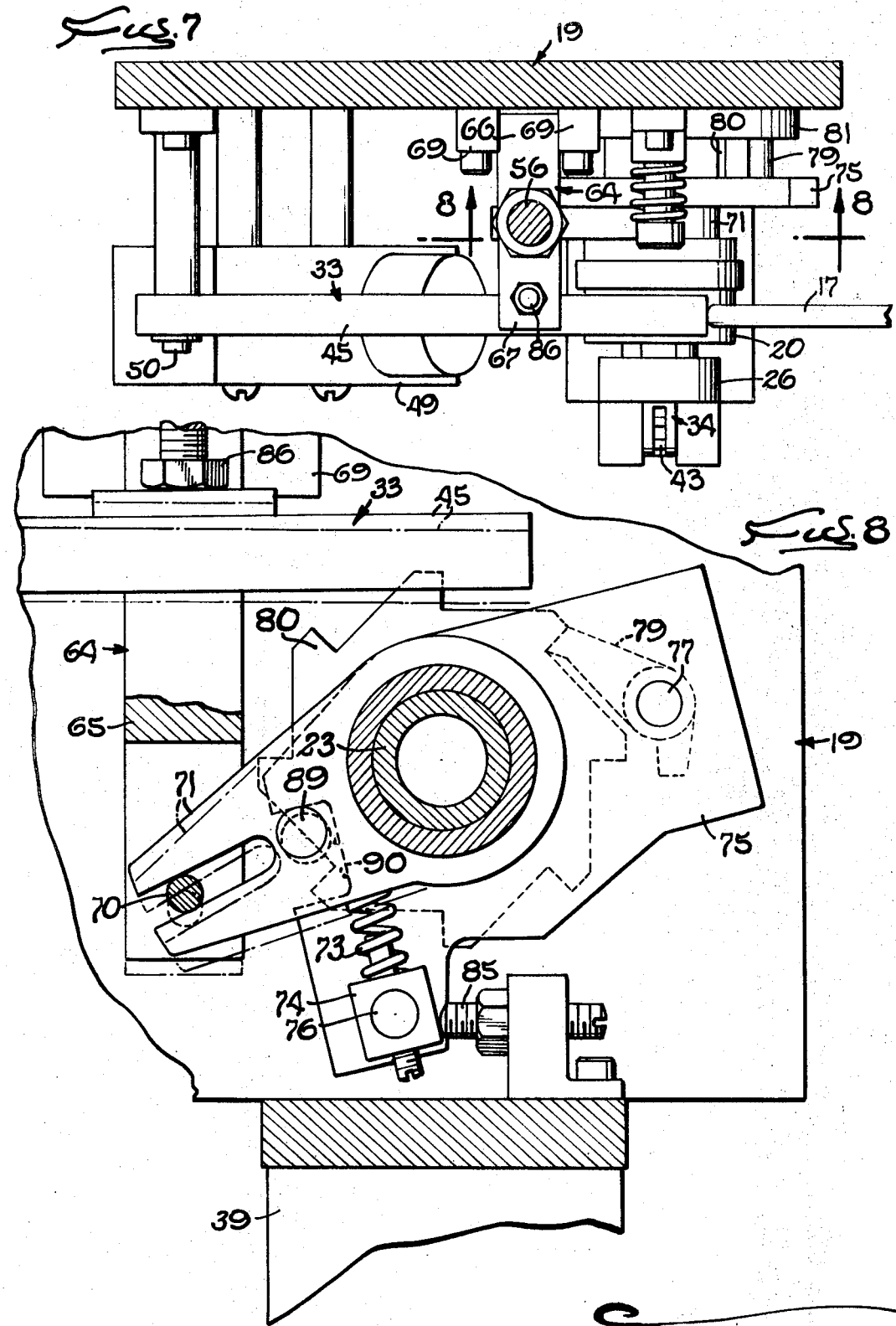

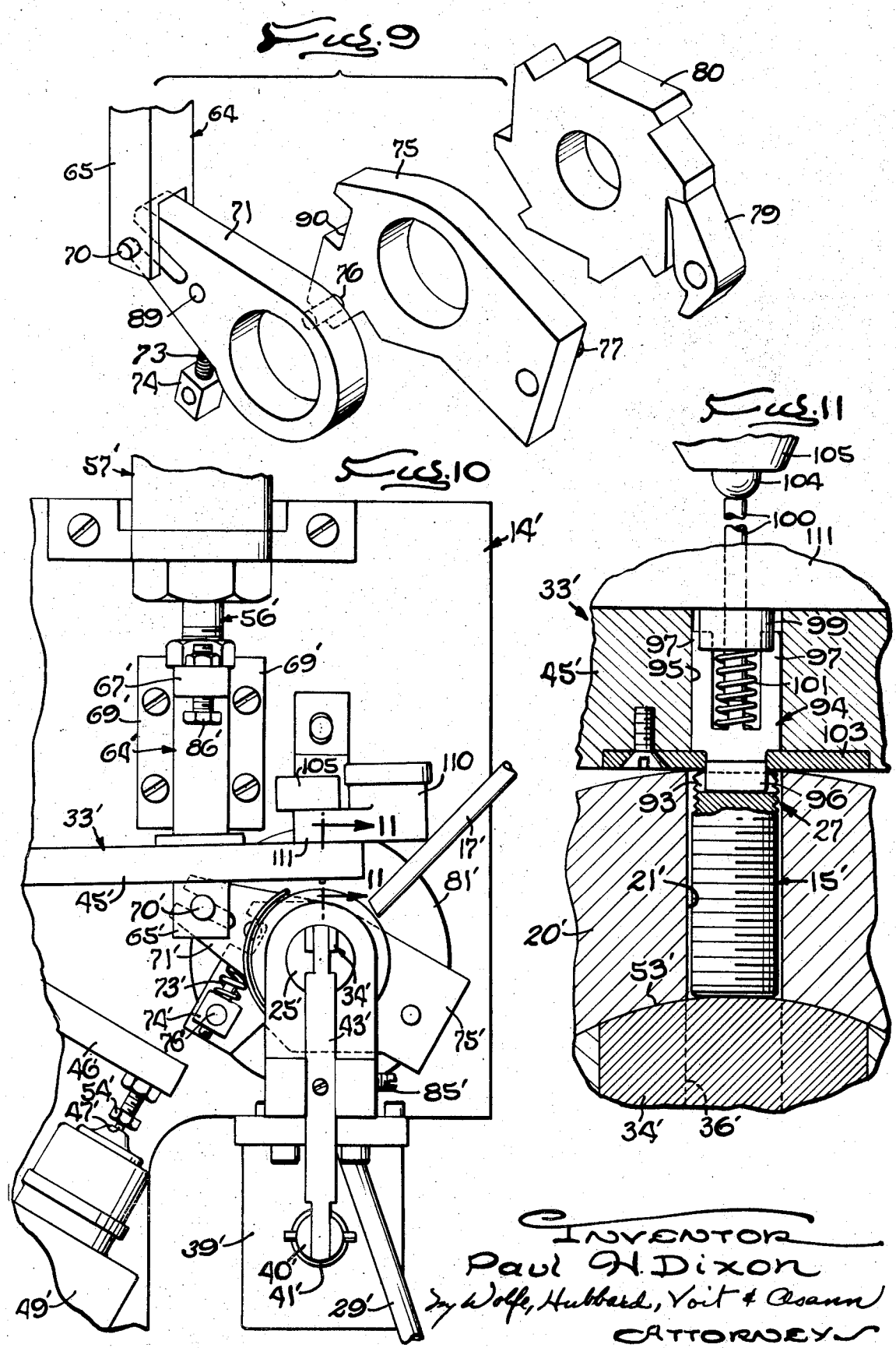

United States Patent Office 3,517,795
Patented June 30, 1970

3,517,795
MACHINE FOR ORIENTING WORKPIECES
Paul H. Dixon, Belvidere, Ill., assignor to Dixon Automatic Tool, Inc., Rockford, Ill., a corporation of Illinois
Filed July 31, 1968, Ser. No. 749,168
Int. Cl. B65g 47/24
U.S. Cl. 198—33                                          9 Claims

ABSTRACT OF THE DISCLOSURE

Randomly disposed screws having dissimilar opposite ends are oriented with their identical ends facing in the same direction by a circular ring adapted to be indexed step-by-step and formed with a series of radially extending and angularly spaced passages for receiving the screws. At a detecting station, a sensor swings toward the ring to detect whether each screw is properly or improperly oriented in its passage and produces a signal indicative of the orientation of the screw. A gate responds to the presence or absence of the signal and either opens the passage of the detected screw to allow the latter to drop directly into a delivery tube or keeps the passage closed to retain the screw in the passage so that the screw will be turned end-for-end as the ring is indexed and before the screw is dropped into the delivery tube. A single hydraulic actuator is used for both indexing the ring and swinging the sensor.

BACKGROUND OF THE INVENTION

This invention relates to a machine for orienting workpieces and, more particularly, to a machine for receiving a supply of randomly disposed workpieces which have opposite ends with different physical characteristics and for sorting and arranging the workpieces such that all of the workpieces are positioned with similar ends facing in the same direction. A typical machine of this type includes a rotatable ring adapted to be indexed step-by-step and formed with a series of angularly spaced and radially extending passages each sized to receive one of the workpieces. Workpieces inserted endwise into the passages at a receiving station are indexed to a detecting station where the orientation of each workpiece is detected. Those workpieces which are oriented properly are permitted to move from their passages directly to a delivery station while the improperly oriented workpieces are retained in the passages and are turned end-for-end during subsequent indexing of the ring and before being released to the delivery station. In this way, the workpieces delivered from the machine are positioned with the identically formed ends of all of the workpieces facing in the same direction.

SUMMARY OF THE INVENTION

The primary aim of the present invention is to provide a new and improved machine of the above character which is particularly suitable for use in orienting workpieces having opposite ends that differ only slightly from one another and that are difficult to distinguish from one another. In large, the foregoing is achieved by detecting the physical characteristics of the ends of the workpieces with a unique sensor and by utilizing the sensor for remotely controlling a novel gate which operates either to leave the workpieces in the passages in the ring or to release the workpieces from the passages. The sensor itself is used only to detect distinctions in the workpiece ends while the gate assumes the burden of actually mechanically handling and sorting the workpieces and, as a result, the sensor is capable of precisely and positively distinguishing between very slight differences in the workpiece ends thereby enabling the sorting and orientation of workpieces with nearly similar ends.

A further object of the invention is to construct the sensor in the form of a feeler or probe movable into engagement with the workpieces in timed relation with the indexing of the ring and capable of detecting either internal or external physical differences in the workpiece ends. The invention also resides in the unique construction of the gate and in the novel provision of a single actuator for moving the probe and for indexing the ring.

Other objects and advantages of the invention will become apparent from the following detailed description taken in conjunction with the accompanying drawings.

BRIEF DESCRIPTION OF THE DRAWINGS

FIG. 1 is a perspective view of an exemplary workpiece adapted to be handled by an orienting machine embodying the novel feature of the present invention.

FIG. 2 is a perspective view of a different type of workpiece adapted to be handled by the machine.

FIG. 3 is a fragmentary front elevation of one embodiment of the new and improved machine.

FIG. 4 is a fragmentary cross-section taken substantially along the line 4—4 of FIG. 3.

FIG. 5 is an enlarged fragmentary cross-section taken substantially along the line 5—5 of FIG. 4 and showing a workpiece arranged in one position.

FIG. 6 is a view similar to FIG. 5 but showing a workpiece arranged in a different position.

FIG. 7 is a fragmentary cross-section taken substantially along the line 7—7 of FIG. 3.

FIG. 8 is an enlarged fragmentary cross-section taken substantially along the line 8—8 of FIG. 7.

FIG. 9 is an exploded perspective view of parts shown in FIG. 8.

FIG. 10 is a view similar to FIG. 3 but showing a second embodiment of a machine incorporating the novel features of the invention.

FIG. 11 is an enlarged fragmentary cross-section taken substantially along the line 11—11 of FIG. 10.

DETAILED DESCRIPTION OF THE PREFERRED EMBODIMENTS

As shown in the drawings for purposes of illustration, the invention is embodied in a machine 14 for receiving randomly disposed workpieces such as threaded screws 15 from a supply hopper (not shown) and for orienting the screws into predetermined positions before delivering the screws to an automatic assembling machine (not shown). Solely to demonstrate the principles of operation of the machine 14, the exemplary screw illustrated in FIG. 1 is shown as being a so-called dog-point set screw which is necked down at one end to form a protuberance or flattened point 16 of reduced diameter. The screws are delivered from the hopper through a tubular magazine 17 (FIG. 3) and are arranged indiscriminately in the latter such that the points 16 of some screws face in one direction while the points of other screws face in the opposite direction. All of the screws must be delivered to the assembling machine with similar ends facing in the same direction (the screws herein being delivered to the assembly machine point-first) and thus it is necessary that the screws be oriented in an identical manner before being fed to the assembling machine.

In general, the machine 14 for properly orienting the screws 15 comprises an upright supporting plate 19 upon which is rotatably journaled a circular ring 20 (FIGS. 4 and 5) formed with a series of angularly spaced and radially extending bores or passages 21 for receiving the screws, there being an even number of the passages such that each one of the passages is alined diametrically with another one of the passages. The ring is fast on a horizontal hub 23 (FIG. 4) rotatably bushed in the plate and is adapted to be indexed step-by-step in a counterclockwise direction (FIG. 5) through steps equal in length to the angular spacing between the passages and with a momentary dwell occurring between successive steps.

Each time the ring 20 dwelss, one screw 15 is fed endwise from the magazine 17 into one of the passages 21 at a receiving station 24 (FIG. 5) located alongside the outer periphery of the ring adjacent one upper quadrant thereof. A generally cylindrical plug 25 attached to a standard 26 (FIG. 4) fastened to the supporting plate 19 is fitted into the center of the ring to retain the screws in the passages with the outer ends of the screws projecting just beyond the outer periphery of the ring. Since the screws are arranged indiscriminately in the magazine, some are properly inserted point-first into the passages and others are inserted reversely into the passages with the points 16 facing outwardly. To orient the screws properlq, the latter are indexed to a detecting station 27 (FIG. 5) spaced angularly around the ring from the receiving station and located at the extreme top of the ring. At the detecting station, the orientation of the screws is sensed, and each screw which is inserted properly or point-first in its respective passage is permitted to drop downwardly from such passage and into the diametrically aligned passage. From there, the screw passes into a delivery tube 29 located in a delivery station 30 at the extreme bottom of the ring and is fed point-first to the assembling machine. Those screws which are detected as being improperly oriented (i.e., with their points facing outwardly) are not permitted to drop from their respective passages at the detecting station 27 but, instead, are retained in the pasages and are carried around to the delivery station 30 during subsequent indexing of the ring, the screws being prevented from falling outwardly of the passages during such indexing by a curved guard rail 31 attached to the standard 26 and extending around one side of the ring. As a result of being indexed around to the delivery station, the originally improperly oriented screws are turned end-for-end and are deposited point-first into the delivery tube so that the points of all of the screws face in the same direction as the screws are received by the assembling machine. Thus, by detecting the orientation of the screws and by permitting the screws to either remain in or drop from their passages, the screws may be sorted and arranged in identical fashion.

According to the primary aspect of the present invention, the orientation of the screws 15 is detected in a unique manner with a sensor 33 which is operable to produce a signal indicative of the positioning of the screws. A novel gate 34 is controlled remotely by the signal and responds to the latter to either close or open the passage 21 of the detected screw thereby to retain the screw in the passage or to permit the screw to drop from the passage. Since the gate actually mechanically sorts the screws according to the signal produced by the sensor, the sensor need only perform the function of detecting the orientation of the screws and is not itself required to handle the screws physically to effect the sorting. As a result, the orientation of screws formed with ends with unusual or very slight physical distinctions can be detected by the sensor and such screws then can be sorted by the gate.

In the present instance, the gate 34 (see FIGS. 4 and 5) is in the form of a flat slide which is guided for back and forth shifting between positions opening and closing the inner end of any particular passage 21 dwelling in the detecting station 27. As shown most clearly in FIG. 4, the gate projects axially into the center of the ring 20 and is guided slidably in a slot 35 formed in the plug 25. Extending vertically through the inner end portion of the gate is a passage or hole 36 which, when the gate is in its normal closed position (FIG. 4), is offset inwardly from the passage 21 dwelling in the detecting station. Thus, as long as the gate remains closed, the screw in the detecting station will be retained in its passage by the gate and will be carried around to the delivery tube 29 upon subsequent indexing of the ring. If the gate is opened or slid outwardly, the hole 36 becomes alined with the passage 21 in the detecting station to permit the screw to drop from the passage through the hole, into a hole 37 extending vertically through the plug, and then into the delivery tube through the diametrically aligned passage 21 in the ring. Accordingly, the screws are either retained in their passages or permitted to drop out of the inner ends of their passages depending upon whether the gate is in its closed or open position.

To shift the gate 34 between its open and closed positions, a normally de-energized solenoid 39 (FIG. 4) is attached to the lower end portion of the supporting plate 19 and includes an armature 40 which is urged outwardly by a coil spring 41 and which is connected pivotally at its free end to the lower end of a lever 43. The latter is pivoted intermediate its ends by a pin 44 on the standard 26 and is attached pivotally at its upper end to the outer end of the gate. Thus, when the solenoid is energized to retract the armature, the lever is rocked counterclockwise to shift the gate outwardly and bring the hole 36 into alignment with the passage 21 in the detecting station 27. Upon de-energization of the solenoid, the spring 41 rocks the lever in the opposite direction to close the gate.

Energization and de-energization of the solenoid 39 is controlled by the sensor 33 which herein is in the form of a probe or feeler adapted to swing downwardly toward the outer end of each screw 15 when the latter dwells in the detecting station 27. As shown in FIG. 3, the feeler 33 is generally V-shaped and is formed with two angularly spaced arms 45 and 46, the former extending into the detecting statipn alongside the top of the ring 20 and the latter projecting alongside an actuator button 47 of a switch 49 mounted on the plate 19 to control the solenoid. The feeler 33 is mounted pivotally on a pin 50 attached to the supporting plate 19 at the junction of the two arms 45 and 46 and, each time the ring dwells, the feeler is swung clockwise (FIG. 3) about the pin to cause the arm 45 to move downwardly toward sensing engagement with the outer end of the screw in the detecting station.

In order to enable the swinging feeler 33 to detect whether the screw 15 is inserted into the passage 21 point-first or reversely, a recess or socket 51 (FIGS. 4 and 6) is provided for receiving the point 16 and is shaped to permit the feeler to swing downwardly to different positions depending upon whether or not the screw is disposed point-first in the passage. While the socket could be formed in the feeler arm 45 to receive the point 16 when the latter faces outwardly, it is shown herein as being formed in an abutment surface 53 defined by the upper surface of the gate 34 and receives the point when the point faces inwardly. As shown in FIG. 6, the socket opens upwardly out of the upper surface of the gate directly beneath the detecting station 27 and is sufficiently large to receive the smaller end of the screw (i.e., the end with the point) but is too small to receive the larger end of the screw.

Accordingly, as each screw 15 properly inserted point-first into one of the passages 21 reaches the detecting gate 34 thereby allowing the screw to slide inwardly in the passage to position the outer end of the screw substantially flush with the outer periphery of the ring 20 (see FIG. 5). As the screw dwells, the feeler 33 is swung downwardly toward the ring and, since the entire screw is disposed within the passage, the arm 45 is permitted to swing downwardly to a position contacting the outer periphery of the ring as shown in dotted lines in FIG. 5. When the arm 45 is permitted to swing to the position, the arm 46 swings downwardly sufficiently far to cause an adjustable switch operator 54 (FIG. 3) carried on the free end of the arm 46 to depress the switch button 47 through a sufficient distance to actuate the switch 49. In this instance, the switch is normally open and is adapted to be closed when actuated by depression of the button through a full stroke. Accordingly, the downwardly swinging arm 46 closes the switch which produces a signal completing a circuit for energizing the solenoid 39. The latter then shifts the gate to its open position to allow the properly oriented screw to drop point-first from the passage 21, through the holes 36 and 37 and into the delivery tube 29 through the diametrically alined passage 21. To permit the gate to open, the socket 51 opens out of the inner end of the gate and its edges slide past the point 16 as the gate is shifted.

Thereafter, the feeler arm 45 is retracted upwardly from the ring 20 (as shown in full lines in FIG. 5) to move the arm 46 away from the switch button 47 thus allowing the switch 49 to open to de-energize the solenoid 39 and thereby cause closing of the gate 34. The ring then is indexed through one step to advance the next screw 15 to the detecting station 27. If this screw should happen to be inserted improperly in the passage 21 with its point 16 facing outwardly, the larger end of the screw simply will abut the upper surface 53 of the gate without entering the socket 51 and thus the screw will remain positioned with its outer end projecting outwardly of the ring as shown in FIG. 6. As a result, the feeler arm 45, upon being swung downwardly toward the ring, will engage the projecting end of the screw and will stop short of contacting the ring. With the arm 45 stopped by the screw, the arm 46 is prevented from swinging downwardly sufficiently far to close the switch 49 and, as a result, the solenoid 39 remains de-energized and the gate remains closed. Accordingly, the improperly oriented screw is retained in the passage and is turned end-for-end during subsequent indexing to the delivery station 30. All of the screws thus are fed point-first to the delivery station regardless of their initial orientation in the passages.

From the foregoing, it will be seen that the screws 15 first are detected by the feeler 33 and then are sorted by the gate 34 which responds to the signal produced by the feeler. Because the feeler need not grip or otherwise physically handle the screws, the machine 14 is fully capable of orienting screws having ends which are nearly similar in size and shape and which do not differ physically from one another sufficiently to enable one end of the screw to be caught mechanically. By simply varying the size or shape of the socket 51, screws with various types of ends may be handled and, indeed, screws having one flat end and one only slightly rounded end may be sorted by shaping the socket to allow the screws to slide further into the passage when inserted into the latter rounded-end-first.

In a more detailed aspect, the invention contemplates the use of a single actuator 55 (FIG. 4) for indexing the ring 20 and for also moving the feeler 33 toward the screws 15 in timed relation with the advance of the ring. To these ends, the actuator includes a reciprocating member 56 which is moved through a stroke of predetermined length each time the actuator is operated and which is coupled to the ring through a lost-motion connection operable to index the ring through one step during the initial portion of the stroke of the member while leaving the ring stationary during the remaining portion of the stroke. After the ring has been indexed to advance one of the screws into the detecting station 27, the remainder of the stroke of the reciprocating member 56 is utilized to move the feeler toward the screw and, in this way, the ring and probe are moved in timed relation and yet only a single actuator is required to effect the movements.

More specifically and as shown in FIG. 4, the actuator 55 herein comprises a fluid-operated motor with a cylinder 57 attached to the supporting plate 19, and the reciprocating member 56 comprises a piston rod which is connected to a piston 58 adapted to slide up and down in the cylinder. As pressure fluid from a source (not shown) is admitted into the upper end of the cylinder through a valve 59 and a line 60, the piston is forced downwardly against the action of a spring 61 telescoped into the cylinder and operable to return the piston upwardly when the valve is shifted to relieve the pressure in the cylinder. The valve may be shifted by a solenoid 63 adapted to be energized or de-energized in response to receiving pulses from the assembling machine.

As the piston 58 and the piston rod 56 are shifted downwardly, the ring 20 is indexed through one step to advance one of the screws 15 into the detecting station 27. For this purpose, the lower end of the piston rod is coupled to a T-shaped slide 64 (FIG. 4) formed with a stem 65 and with two cross-arms 66 and 67 extending laterally from the upper end of the stem, the cross-arm 66 being supported for up and down sliding by a pair of guides 69 (FIG. 3) fastened to the supporting plate 19. The lower end of the stem is connected pivotally by a pin 70 (see FIGS. 8 and 9) to a lever 71 which is mounted for turning on the hub 23 and which is coupled by a compression spring 73 to a small block 74 located beneath the lever. A second lever 75 also is mounted for turning on the hub and is connected to the lever 71 by a pin 76 projecting into a hole in the block 74. Carried on the lever 75 is an additional pin 77 which pivotally mounts a pawl 79 adapted to engage the teeth of a ratchet 80, the latter being fast on the hub 23. The pawl may be biased into engagement with the ratchet teeth by a spring (not shown).

Upon initial downward movement of the piston rod 56 and the slide 64, the lever 71 is rocked counterclockwise (FIG. 8) about the hub 23 and acts through the spring 73 to rock the lever 75 in a similar direction. Rocking of the lever 75 causes the pawl 79 to advance the ratchet 80 through one step and, since the ratchet and the ring 20 are both fastened to the hub 23, the ring also is indexed through one step to advance one of the screws 15 into the detecting station 27. A friction disc 81 (FIG. 4) fastened to the face of the ratchet bears against the supporting plate 19 and holds the ratchet stationary after the indexing has been completed.

As soon as the ratchet 80 and the ring 20 have been indexed through a full step, the block 76 engages an adjustable stop 85 (FIG. 8) on the supporting plate 19 and is prevented from moving downwardly beyond the position shown in FIG. 8. The slide 64, however, continues its downward stroke as the piston 58 approaches the bottom of the cylinder 57 and continues to rock the lever 71 about the hub 23. Because the block 76 is held against the stop 85, such rocking is not transmitted to the lever 75 but, instead, the spring 73 simply compresses and permits further downward movement of the slide 64 and continued rocking of the lever 71 without causing rocking of the lever 75 and wthout causing further advancement of the ratchet by the pawl. The spring 73 thus constitutes a lost-motion connection which allows the ring to dwell while the slide completes its downward stroke.

The final porton of the downward stroke of the slide 64 is utilized to shift the feeler 33 downwardly toward the screw 15 dwelling in the detecting station 27. As shown in FIG. 3, the cross-arm 67 of the slide carries an adjustable bolt 86 (FIGS. 3 and 4) which overlies the feeler arm 45. After the ring 20 dwells and as the slide continues through its downward stroke, the bolt engages the feeler arm 45 and forces the latter downwardly toward the ring into sensing relation with the screws. Thus, the same actuator 55 is used for indexing the ring and for shifting the feeler, the lost-motion connection formed by the spring 73 permitting the feeler to be shifted but delaying such shifting until after the ring has dwelled.

After the feeler arm 54 has moved into sensing engagement with one of the screws 15, the pressure fluid is dumped from the cylinder 57 to allow the spring 61 to force the piston 58 and the slide 64 upwardly through their return strokes. As the bolt 86 moves away from the feeler arm 45, the latter is shifted upwardly from the ring 20 to permit another screw to be indexed into the detecting station 27 and to position the arm for downward shifting during the next operatnig cycle. Upward shifting of the feeler arm is effected by a spring 87 (FIG. 3) disposed within the housing of the switch 49 and adapted to be loaded when the button 47 is depressed by the arm 46. Even though the arm 46 is not permitted to swing downwardly sufficiently far to close the switch when the screws are inserted into the passages 21 with the points 16 facing outwardly, the arm still depresses the button 47 through a sufficient distance to load the spring. Accordingly, the spring 87 shifts the feeler 33 upwardly each time the bolt 86 moves away from the arm 45.

As soon as the feeler 33 is retracted upwardly, the pawl 79 is swung clockwise about the hub 23 and into engagement with the next succeeding tooth of the ratchet 80 preparatory to indexing the ratchet through another step. For this purpose, a pin 89 (FIGS. 8 and 9) on the lever 71 fits into an enlarged notch 90 formed in the end of the lever 75. Once the slide 64 has rocked the lever 71 clockwise about the hub sufficiently far to allow the spring 73 to expand, the pin 89 engages the upper edge of the notch 90 and transmits the rocking of the lever 71 to the lever 75. As a result, the pawl is swung clockwise about the hub and drops into engagement with the next ratchet tooth as the slide 64 completes its upward stroke.

A second embodiment of a workpiece-orienting machine is shown in FIGS. 10 and 11 in which parts corresponding to those of the first embodiment are indicated by the same but primed reference numerals. The machine 14' is particularly advantageous in orienting workpieces whose ends are externally identical and differ only in internal characteristics, as for example, a set screw 15' (FIG. 2) having one uninterrupted flat end and having a similar flat end formed with a recess such as a screwdriver slot 93. It may be assumed for purposes of describing the machine 14' that it is desired to feed the screws 15' into the delivery tube 29' with the slots 93 facing upwardly.

For the most part, the machine 14' is identical to the machine 14 of the first embodiment but includes a sensor or feeler 33' (FIG. 11) with a probe 94 for seeking out the slots 93 of the screws 15' in the passages 21' of the ring 20' and for producing a signal only upon detecting that the slots are facing in a predetermined direction. As shown in FIG. 11, the probe 94 is journaled for rotation and guided for up and down sliding in a hole 95 in the feeler arm 45' and is formed on its lower end with a screwdriver blade 96 which is sized to fit the slots in the screws. The probe includes a pair of vertically extending legs 97 slidable within slots formed in the sides of a shaft 99 located in the upper end of the hole 95, a stem 100 disposed between the legs and projecting upwardly through the shaft and the feeler arm 45', and a coil spring 101 surrounding the stem and abutting the shaft to urge the probe downwardly against a retaining plate 103 fastened to the underside of the arm. At its upper end, the stem abuts an actuator button 104 of a switch 105 which is carried on the feeler arm 45'. The switch 105 is connected in series with the solenoid 39' and the switch 49' and is closed when the actuator button 104 is released as is normally the case.

As shown in FIG. 11, the gate 34' of the machine 14' does not include a socket for receiving the screws 15', and the screws, regardless of their orientation, do not project outwardly beyond the outer periphery of the ring. Accordingly, the feeler arm 45' contacts the ring 20' each time the arm is swung downwardly and thus the feeler arm 46' depresses the switch button 47' sufficiently far to close the switch 49' on each downward stroke of the feeler 33'. If the screw 15' dwelling in the detecting station 27' is inserted improperly into its passage 21' with the slot 93 facing downwardly, the screwdriver blade 96, upon moving downwardly with the feeler arm 45', engages the uninterrupted end of the screw and stops just before the arm 45' contacts the ring 20'. The switch 105, however, continues to move downwardly with the arm as the spring 101 yields and thus the switch button 104 is forced downwardly against the upper end of the stationary stem 100 to depress the button 104 and open the switch 105. Accordingly, the solenoid 39' remains de-energized even though the switch 49' has been opened by the arm 46' and thus the gate 34' remains closed to retain the screw 15' in the passage 21'. The screw then is turned end-for-end upon being indexed around to the delivery tube 29' and is fed into the tube with the slot 93 facing upwarly. As soon as the feeler arm 45' is retracted away from the ring, the spring 101 relaxes to force the stem downwardly with respect to the switch button 104 thereby to close the switch 105 preparatory to the next cycle.

If the screw 15' in the detecting station 27' is disposed properly in the passage 21' with the slot 93 facing upwardly, the screwdriver blade 96 enters the slot as the feeler arm 45' moves downwardly and does not stop before the arm contacts the ring 20'. Thus, no relative motion occurs between the stem 100 and the switch button 104 so that the switch 105 remains closed. As the arm 45' contacts the ring, the arm 46' depresses the switch button 47' to close the switch 49' and to energize the solenoid 39' through the closed switch 105. The gate 34' then is opened to allow the screw to drop from the passage 21' directly into the delivery tube 29' with the slot facing upwardly. Thus, by using the probe 94 as the sensor, the machine 14' is capable of detecting and orienting screws or other workpieces whose ends differ only in the provision of a recess 93 in one of the ends.

Advantageously, the screwdriver blade 96 is rotated as it is moved into sensing engagement with the screws 15' in order that the blade can seek out and become alined with the slots 93 if the screws are inserted into the passages 21' with the slots facing upwardly. For this purpose, a small electric motor 110 (FIG. 10) is carried on the upper side of the feeler arm 45' and is connected through a gear box 111 to rotate the shaft 99. Because of the legs 97 projecting into the slots in the shaft 99, the probe 94 is turned when the shaft is rotated. Each time the probe is moved into sensing engagement with one of the screws, the motor is energized momentarily (preferably, by the same pulse used for energizing the valve solenoid 63) to turn the shaft through at least one revolution. The shaft then turns the probe to insure that the screwdriver blade 96 will find the slot 93 if the latter is facing upwardly and will enter into the slot rather than stopping against the end of the screw and crosswise of the slot to cause opening of the switch 105.

What is claimed is:

1. Apparatus for orienting elongated workpieces having first and second ends with different characteristics, said apparatus including a support, a ring journaled to rotate about a generally horizontal axis on said support and formed with a series of angularly spaced workpiece-receiving passages extending radially through the ring with each one of the passages alined diametrically with another one of the passages, mechanism for indexing said ring step-by-step about said axis with each of the passages dwelling first in a receiving station, then in a detecting station located adjacent the upper portion of the ring and then in a delivery station spaced diametrically around the ring from the detecting station, and means at said receiving station for inserting a workpiece endwise into each passage when the latter dwells in said receiving station whereby the workpiece is carried to the detecting station upon subsequent indexing of the ring, the improvement in said apparatus comprising, a gate located within the center portion of said ring and mounted for movement between positions closing and opening the inner end of each passage when the latter dwells in said detecting station whereby a workpiece remains in such passage for subsequent indexing to the delivery station when the gate is in its closed position and drops into the diametrically alined passage to the delivery station when the gate is in its open position, a sensor located in said detecting station for sensing the outer end of a workpiece dwelling in said detecting station and operable to produce a particular signal only in response to sensing that the first end of the workpiece is disposed outwardly of the second end, and means responsive to said signal for moving said gate from one of said positions to the other of said positions whereby said workpiece either remains in its original passage or drops into the alined passage depending upon the presence or absence of said signal.

2. Apparatus as defined in claim 1 in which said gate is mounted for back and forth movement axially of the ring between said closed and open positions.

3. Apparatus as defined in claim 1 in which said gate is formed with an upright workpiece passage disposed in alinement with the passage in the detecting station in the open position of said gate and disposed out of alinement with the passage in the detecting station in the closed position of the gate.

4. Apparatus for orienting elongated workpieces having first and second end portions with different characteristics, said apparatus including a support, a ring journaled for rotation on said support and formed with a series of angularly spaced workpiece-receiving passages extending radially through the ring, mechanism for indexing said ring step-by-step with each of the passages dwelling successively in receiving, detecting and delivery stations spaced angularly around the ring, and means at said receiving station for inserting a workpiece endwise into each passage when the latter dwells in said receiving station whereby the workpiece is carried to the detecting station upon subsequent indexing of the ring, the improvement in said apparatus comprising, a gate located within the center portion of said ring and mounted for movement between positions closing and opening the inner end of each passage when the latter dwells after reaching the detecting station and before reaching the delivery station whereby a workpiece remains in such passage for subsequent indexing to the delivery station when the gate is in its closed position and is free to move through the passage when the gate is in its open position, a sensor located to sense the outer end of a workpiece dwelling in said detecting station and operable to produce a particular signal only in response to sensing that the first end of the workpiece is disposed outwardly of the second end, and means responsive to said signal for moving said gate from one of said positions to the other of said positions.

5. Apparatus as defined in claim 4 in which said indexing mechanism comprises an actuator having a member movable through a stroke of predetermined length as an incident to operation of said actuator, a lost-motion connection between said member and said ring and operable to index the ring through one step during the initial portion of said stroke while leaving the ring stationary during the remaining portion of said stroke, said sensor being mounted for movement toward and away from said ring in timed relation with the indexing of the ring, and means connecting said sensor with said member during the remaining portion of said stroke to move the sensor toward the ring while the latter is stationary.

6. Apparatus for orienting elongated workpieces having first and second end portions with different external characteristics, said apparatus including a support, a ring journaled for rotation on said support and formed with a series of angularly spaced workpiece-receiving passages extending radially through the ring with each one of the passages alined diametrically with another one of the passages, mechanism for indexing said ring step-by-step with each of the passages dwelling successively in receiving detecting and delivery stations spaced angularly around the ring, and means at said receiving station for inserting a workpiece endwise into each passage when the latter dwells in said receiving station such that the workpiece is carried to the detecting station upon subsequent indexing of the ring, the improvement in said apparatus comprising, an abutment surface located within the center portion of said ring and engageable with the inner ends of workpieces dwelling in said detecting station, a feeler member located in said detecting station for sensing the orientation of the workpieces and movable inwardly into engagement with the outer end of a workpiece when the latter dwells in the detecting station, a recess in one of said members for receiving one end of the workpiece and shaped to permit the feeler member to move inwardly to one position when the workpiece is inserted into the passage first-end-first and to move inwardly to a different position when the workpiece is inserted into the passage second-end-first, said feeler member being operable to create a particular signal only upon moving to one of said positions, a gate located within the center portion of said ring and mounted for movement between positions closing and opening the inner end of each passage when the latter dwells after reaching the detecting station and before reaching the delivery station whereby a workpiece remains in such passage for subsequent indexing to the delivery station when the gate is in its closed position and is free to move into the diametrically alined passage when the gate is in its open position, and means operable in response to the creation of said signal for moving said gate between said closed and opened positions.

7. Apparatus for orienting workpieces having a first end with a specially designed recess and having a second end without such specially designed recess, said apparatus including a support, a ring journaled for rotation on said support and formed with a series of angularly spaced workpiece-receiving passages extending radially through the ring with each one of the passages alined diametrically with another one of the passages, mechanism for indexing said ring step-by-step with each of the passages dwelling successively in receiving, detecting and delivery stations spaced angularly around the ring, and means at said receiving station for inserting a workpiece endwise into each passage when the latter dwells in said receiving station such that the workpiece is carried to the detecting station upon subsequent indexing of the ring, the improvement in said apparatus comprising, a gate located within the center portion of said ring and mounted for movement between positions closing and opening the inner end of each passage when the latter dwells after reaching the detecting station and before reaching the receiving station whereby a workpiece remains in such passage for subsequent indexing to the delivery station when the gate is in its closed position and is free to move into the diametrically alined passage when the gate is in its open position, a probe located in said detecting station and movable toward a workpiece when the latter dwells in said detecting station, said probe entering said recess and stopping in one position when said workpiece is turned with said first end facing outwardly, and said probe engaging the workpiece and stopping in a second position when said workpiece is turned with said second end facing outwardly, means for creating a particular signal only when said probe is in one of said positions, and means responsive to said signal for moving said gate between said closed and open positions.

8. Apparatus as defined in claim 7 in which said probe includes an end portion shaped to fit into said recess, and further including means for rotating said probe to cause said end portion to become alined with and enter said recess when the probe is moved toward the workpiece with the latter turned with said first end facing outwardly.

9. Apparatus for orienting workpieces having first and second ends with different characteristics, said apparatus including a support, a ring journaled for rotation on said support and formed with a series of angularly spaced workpiece-receiving passages extending radially through the ring, mechanism for indexing said ring step-by-step with each of the passages dwelling successively in receiving and detecting stations spaced angularly around the ring, and means at said receiving station for inserting a workpiece into each passage when the latter dwells in said receiving station whereby the workpiece is carried to the detecting station upon subsequent indexing of the ring, the improvement in said apparatus comprising, a gate mounted adjacent said ring and mounted for movement between a position retaining the workpieces in the passages and a position permitting the workpiece to move from the passages, a sensor located to sense the outer end of a workpiece dwelling in said detecting station and operable to produce a particular signal only in response to sensing that the first end of the workpiece is disposed outwardly of the second end, and means responsive to said signal for moving said gate from one of said positions to the other of said positions.

References Cited

UNITED STATES PATENTS 2,630,221    3/1953    Stewart    198—33

EVON C. BLUNK, Primary Examiner

A. N. GOODMAN, Assistant Examiner

U.S. Cl. X.R.

221—171